though per hour may amount to 10 to 1000 times the
United States Patent Office 3,457,155
Patented July 22, 1969

3,457,155
PROCESS FOR PREPARING SULFONIC ACIDS
Sigurd Rosinger, Frankfurt am Main, Germany, assignor to Farbwerke Hoechst Aktiengesellschaft vormals Meister Lucius & Brüning, Frankfurt am Main, Germany, a corporation of Germany
No Drawing. Filed Apr. 28, 1966, Ser. No. 545,842
Claims priority, application Germany, May 4, 1965, F 45,953
Int. Cl. B01j 1/10
U.S. Cl. 204—162         6 Claims The present invention relates to a process for preparing sulfonic acids.

It is known from German Patent 1,139,116 to prepare sulfonic acids by exposing a mixture of paraffin hydrocarbons containing 10 to 30 carbon atoms and a gas mixture of sulfur dioxide and oxygen to the continuous action of gamma rays. According to F. Asinger, "Chemie und Technologie der Paraffinkohlenwasserstoffe," Berlin, 1956, two groups of paraffin hydrocarbons are distinguished, one of which comprises hydrocarbons that continue to react automatically with sulfur dioxide and oxygen to yield sulfonic acids as soon as the reaction has been initiated by irradiation, introducing ozone or adding per-acids. Members of this group are cyclohexane, methyl cyclohexane and heptane. The compounds of the other group, which mainly comprises high molecular weight paraffin hydrocarbons, only react with sulfur dioxide and oxygen when they are continuously subjected to one of the aforesaid modes of action.

It has already been proposed to initiate the reaction between paraffin hydrocarbons and sulfur dioxide and oxygen by irradiating the entire reaction mixture and then to finish the reaction without irradiation.

Now I have found a process for preparing aliphatic and cycloaliphatic sulfonic acids by reacting aliphatic and cycloaliphatic hydrocarbons containing 10 to 30 carbon atoms with sulfur dioxide and oxygen, which comprises initiating the reaction by the action of high energy ionizing radiation on the gas mixture of sulfur dioxide and oxygen and then combining the gas mixture, which has been activated in this manner, with the aliphatic reactant, whereupon the sulfonation reaction proceeds.

As high energy ionizing radiation there can be used, for example, gamma radiation with a low dose rate of about $10^2$ rads/hr. as well as with a high dose rate of several Mrads/hr. Radiations of this type can be derived from a cobalt 60 source of 50 to 500,000 curies. It is also possible to use the beta radiation of radionuclides, for example of strontium 90, the radiation of spent fuel elements of nuclear reactors or the radiation of a nuclear reactor itself. Still further, it is possible to use X-rays or electrons rich in energy from accelerators for initiating the reaction.

The sulfonic acids of the aforesaid hydrocarbons can be prepared at temperatures within the range of from —20 to +100° C., preferably 0 to 30° C. The pressure applied ranges between 0 and 50 atmospheres gage, in special cases also thereabove, pressures between 0 and 5 atmospheres gage being preferred. The gas mixture consisting of sulfur dioxide and oxygen is suitably used in a great excess. The volume of the gas mixture passed through per hour may amount to 10 to 1000 times the volume of the paraffin hydrocarbons used, 50 to 500 times the volume being preferred. According to the reaction equation, the ratio of sulfur dioxide to oxygen must be at least equal to 2:1. It is suitable, however, to use gas mixtures having a higher content of sulfur dioxide in a ratio of 4:1 to 20:1. Mixing ratios in the range of from 6:1 to 15:1 are especially advantageous. As starting materials there may be used hydrocarbons such as cetane, mineral oil or paraffin fractions of the refineries.

Air can be used as oxygen-containing gas, particularly when the reaction is carried out in discontinuous manner. The gas mixture is suitably introduced in fine distribution, for example with the aid of an annular device, into the reaction mixture.

The process according to the invention can also be carried out by exposing the gas mixture to radiation when the mixture is passed through an inert liquid. When using this method, there is attained a compression of the gas, a longer residence time in the radiation zone and, thereby, an enrichment of activated particles. As liquid there may be used, for example, a mixture of highly-branched hydrocarbons which is subject to the sulfonation reaction to a very small degree only.

Fundamentally, the process according to the invention can be carried out either continuously or discontinuously. In the discontinuous process the reaction, which has been started by the supply of energy, is continued with further introduction of the activated reactants until the complete conversion of the paraffn hydrocarbons in the reaction vessel. The continuous mode of execution of the process is carried out in one or in two vessels. It is advantageous to remove the formed sulfonic acid continuously from the reaction vessel. For this purpose settling vessels are used or mechanical centrifuging or extracting processes are applied, using selective solvents, for example, water or liquid sulfur dioxide. The reaction mixture can be transferred by means of pumps from the reaction vessels to separating units, for example centrifuges, where the formed sulfonic acid is separated as highly concentrated, almost colorless oil. For further processing the said oil can be introduced, for example, into water or a mixture of water with another solvent, such as methanol or acetone. In this manner a colorless, highly concentrated sulfonic acid is obtained which can be transformed into the corresponding salts.

It was not to be expected that the process according to the present invention could be carried out under the conditions indicated above, only by the action of high energy ionizing radiation on the gas mixture of sulfur dioxide and oxygen. This is contradictory to the prevailing opinion according to which the activation of the hydrocarbon is the essential step in the chain reaction.

The great advantage of using the process according to the present invention is that the reaction vessels can be installed outside the radiation zone. Such an arrangement has many advantages as regards the mode of operation and the reaction control. On the one hand, the expenditure on apparatus is much less when the reaction is carried out outside the radiation zone instead of inside; a smaller number of fittings in the radiation zone are required since paraffin pipes can be dispensed with, and less of the naturally limited space of the radiation zone is occupied. It is obvious that the attendance or repair of the reaction vessels can be carried out more easily outside the range of action of high energy ionizing radiation than within said range of action. On the other hand, exposure of the reaction vessel to radiation is avoided which simplifies the manufacture of the reaction vessel and reduces the cost thereof since it need not correspond to the regulations on protection against radiation; above all, however, the paraffin hydrocarbons per se are no longer exposed to radiation whereby undesired side reactions by way of radical intermediate stages are avoided; for example, there is no evolution of hydrogen.

The salts of long-chain sulfonic acids are used, for example, as detergents that can be destroyed biologically.

The following example serves to illustrate the invention but it is not intended to limit it thereto:

EXAMPLE

A mixture of sulfur dioxide and oxygen in a ratio of

8:1 was passed at a flow rate of 8 cu. m./hr. through a radiation vessel (capacity: 30 liters) which, at 25° C., was exposed to gamma rays at a dosage rate of $4\cdot 10^3$ rads/hour. The gas mixture which had been irradiated in this manner was then passed into a reaction vessel (capacity: 15 liters) containing, at 25° C., 12 liters of a hydrocarbon mixture having carbon numbers of from 10 to 20. After some time the formation of sulfonic acids set in which first separated on the bottom of the vessel. After a period of operation of about 80 hours, in which the reactants were added in a continuous manner, 200 grams of an oleaginous liquid separated per hour. The oil which was collected in water contained 70% to 75% of sulfonic acid.

I claim:

1. A process for preparing aliphatic and cycloaliphatic sulfonic acids by reacting aliphatic and cycloaliphatic hydrocarbons containing 10 to 30 carbon atoms with sulfur dioxide and oxygen, which comprises initiating the reaction by the action of high energy ionizing radiation on the gas mixture of sulfur dioxide and oxygen and reacting the gas mixture activated in this manner with the aliphatic reactant without further exposure to radiation.

2. The process as claimed in claim 1, wherein the high energy ionizing radiation used is beta- or gamma-radiation having a dose rate of $10^2$ to $10^7$ rads/hour.

3. The process as claimed in claim 1, wherein the volume of the gas mixture passed through per hour amounts to 10 to 1000 times the volume of the liquid.

4. The process as claimed in claim 1, wherein the reaction gas contains sulfur dioxide and oxygen in a ratio of from 2:1 to 20:1.

5. The process as claimed in claim 1 wherein said reaction is initiated by the action of X-rays.

6. The process as claimed in claim 1 wherein said reaction is initiated by the action of energy-rich electrons.

References Cited

UNITED STATES PATENTS

| | | | |
|---|---|---|---|
| 3,259,664 | 7/1966 | Ray et al. | 204—163 X |
| 3,325,387 | 6/1967 | Black | 204—162 |

FOREIGN PATENTS

| | | |
|---|---|---|
| 1,086,879 | | Great Britain. |
| 122,830 | | U.S.S.R. |

HOWARD S. WILLIAMS, Primary Examiner